Patented Jan. 5, 1932

1,840,198

UNITED STATES PATENT OFFICE

HEINRICH HEIMANN, OF DESSAU IN ANHALT, IRNFRIED PETERSEN, OF WOLFEN, KREIS BITTERFELD, AND ALFONS BAYERL AND HERMANN SEEFRIED, OF DESSAU IN ANHALT, GERMANY, ASSIGNORS TO I. G. FARBENINDUSTRIE AKTIENGESELLSCHAFT, OF FRANKFORT-ON-THE-MAIN, GERMANY

PROCESS FOR THE EXTRACTION OF CELLULOSE FROM MATERIALS CONTAINING CELLULOSE

No Drawing. Application filed April 12, 1930, Serial No. 443,914, and in Germany May 10, 1927.

Our present invention relates to an improved process for separating or extracting cellulose from materials containing cellulose, such as wood, straw, etc. More particularly it relates to a process in which the decomposition of the raw material is carried out with nitric acid.

Another object of our invention consists in a specific after-treatment of the cellulose fibers completely or partly freed from the accompanying substances.

This specification is a continuation-in-part of our copending application Ser. No. 276,496, filed on May 9, 1928.

We have found that materials containing cellulose, such as wood of conifers or of leaved trees or straw, esparto and so on, can be separated in cellulose and non-cellulose compounds in a simple manner and with very good yields by impregnating them with diluted cold or warm nitric acid and by allowing the starting material thus impregnated to stand until the process is completed. The dilute acid we use, may contain from about 5 to 45 per cent of nitric acid. The impregnation of the cellulose-containing material with the said acid may be carried out at atmospheric pressure. For the more rapid and complete penetration of the vegetable fibers with nitric acid, however, the material may be put into a pressure vessel, and the nitric acid may be pressed into the material by applying a pressure up to 5 atmospheres. On the other hand, the complete impregnation may be performed by applying a vacuum whereby the air contained in the material at first is removed, and then the nitric acid is soaked into the material when exposing the evacuated material, covered with the acid, to atmospheric pressure. The temperature of the nitric acid and the temperature at which the impregnated material is allowed to stand, may be varied within wide limits. It may be, for instance, room temperature or it may be raised up to about 60° C., care being taken, however, that formation of nitrogen oxides arising at higher temperatures by the action of nitric acid upon cellulose, causing decomposition of the cellulose molecule, is avoided as completely as possible. A diminished pressure may likewise be applied when completing the opening-up process while allowing the impregnated material to stand.

Instead of impregnating the cellulose-containing material with dilute nitric acid, we may use a mixture of a nitrate with, for instance, hydrochloric acid, or we may impregnate it with a nitrate and then with an acid setting free nitric acid.

The quantity of acid we use, corresponds to that necessary to impregnate the material completely. Any excess preferably is withdrawn.

When treating wood in the manner described, preferably it is broken in small bits the greatness of which may be varied according to the structure of fibers.

Finally, the material thus treated according to our invention is boiled in the known manner with an alkaline agent, and there is obtained a very pure cellulose with a high content of α-cellulose, especially when carrying out the process at room temperature or at a temperature only moderately raised. The cellulose obtained is free of decomposition products. The end-product may be used as a starting material in the manufacture of artificial silk, or of cellulose ethers and esters.

When operating in the manner described, the period of time can be reduced and the starting material be decomposed uniformly by after-treating the cellulose-containing material impregnated with dilute nitric acid with water of a temperature of about 50 to 90° C. or with water containing small quantities of nitric acid, for instance, 0.5 to 10 per cent. The resulting extremely favorable heat transmission accelerates the decomposition of the non-cellulosic compounds to an essential degree.

By this simultaneous gradually proceeding dilution of the nitric acid, a degradation of the fiber is avoided, and the greatest portion of nitric acid used, can be recovered in this manner. If necessary, this after-treatment may be repeated.

The time of treatment and of after-treatment depends upon the structure of the material to be decomposed, upon the strength of the nitric acid, the temperature employed and the pressure. Generally, a pre-treatment of the starting materials, for instance, with an alkali, is superficial. The best conditions to be chosen for every cellulose-containing material may be found by a simple experiment. The completeness of the decomposition may be ascertained by a simple proof known in the art; it is reached if a sample of the treated material is completely disintegrated when boiled at ordinary pressure for 30 to 60 minutes with an aqueous solution of caustic soda of about 2 per cent strength.

The following examples illustrate the invention without limiting it.

*Example 1.*—Air-dried pine-wood shavings of about ½ cm. thickness are treated with nitric acid of 20 per cent strength at a temperature of 50° C. until they are completely impregnated after about 3 hours. Then they are freed from the excess of acid by decantation and allowed to stand for about 48 hours until a sample is disintegrated completely when subjected to the testing process mentioned above. The opened-up material is worked up in the known manner by boiling it for 2 hours with sixfold its quantity of caustic soda solution of 2 per cent strength.

*Example 2.*—Pine-wood shavings are treated under a diminished pressure corresponding to 2 to 6 cm. mercury with cold nitric acid of 12 per cent strength until they are completely impregnated after about 15 hours. Then they are freed from the excess of acid, and the fibers thus impregnated, are allowed to stand under the same diminished pressure at a temperature of about 50 to about 60° C. until the decomposition is complete after about 6 hours. In this manner the process is carried out in an essentially shorter time than that as described in Example 1.

*Example 3.*—Beech wood shavings are treated under diminished pressure with cold nitric acid of 18 per cent strength having a temperature of 20° C. until after 48 hours they are completely impregnated. They are freed from the excess of acid, and the fibers thus impregnated are allowed to stand for about 8 days at room temperature until a sample shows the completeness of the process.

The after-treatment, mentioned above, may be illustrated by the following Example 4.

*Example 4.*—Air-dried pine wood shavings are treated with nitric acid of 10 per cent strength according to the conditions of one of the examples given above. After the excess of acid has been removed, the mass completely impregnated therewith is treated with water at a temperature of 70 to 80° C. Instead of ordinary water, we may use diluted nitric acid containing up to 1 per cent of $HNO_3$. Generally, the decomposition is complete after 5 to 6 hours, otherwise the after-treatment with dilute nitric acid under the conditions given above, may be repeated. The material is worked up in the manner described.

What we claim is:—

1. The process of extracting cellulose from material containing cellulose, the steps which consist in impregnating the material with nitric acid, withdrawing excess acid and allowing the impregnated material to stand until a sample is disintegrated completely when boiled at ordinary pressure for 30 to 60 minutes with an aqeuous solution of caustic soda of about 2 per cent strength.

2. In the process of extracting cellulose from material containing cellulose, the steps which consist in impregnating the material with nitric acid of a temperature of about 15 to 60° C., withdrawing excess acid and allowing the impregnated material to stand until a sample is disintegrated completely when boiled at ordinary pressure for 30 to 60 minutes with an aqueous solution of caustic soda of about 2 per cent strength.

3. In the process of extracting cellulose from material containing cellulose, the steps which consist in impregnating the material with nitric acid, withdrawing excess acid and allowing the impregnated material to stand at a temperature of about 15 to 60° C. until a sample is disintegrated completely when boiled at ordinary pressure for 30 to 60 minutes with an aqueous solution of caustic soda of about 2 per cent strength.

4. In the process of extracting cellulose from material containing cellulose, the steps which consist in impregnating the material with cold nitric acid, withdrawing excess acid and allowing the impregnated material to stand at a pressure lower than atmospheric pressure until a sample is disintegrated completely when boiled at ordinary pressure for 30 to 60 minutes with an aqueous solution of caustic soda of about 2 per cent strength.

5. The process of extracting cellulose from material containing cellulose, the steps which consist in impregnating the material with nitric acid, withdrawing excess acid and accelerating the reaction by an after-treatment of the partly decomposed material with a washing agent of the group consisting of water and water containing nitric acid up to 10 per cent, said washing agent having a temperature of 50 to 90° C.

6. In the process of extracting cellulose from material containing cellulose, the steps which consist in impregnating the material with nitric acid of a temperature of about 15 to 60° C., withdrawing excess acid and accelerating the reaction by an after-treatment of the partly decomposed material with a washing agent of the group consisting of water and water containing nitric acid up to 10 per cent, said washing agent having a temperature of 50 to 90° C.

In testimony whereof, we affix our signatures.

HEINRICH HEIMANN.
IRNFRIED PETERSEN.
ALFONS BAYERL.
HERMANN SEEFRIED.